June 25, 1929.  E. B. MEAD  1,718,475
INTERNAL COMBUSTION ENGINE
Filed July 29, 1925
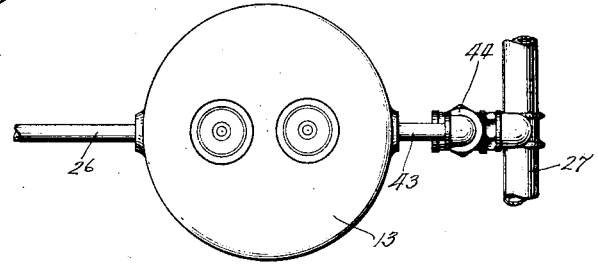
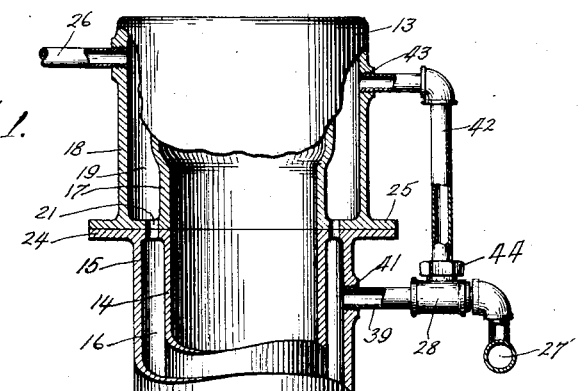
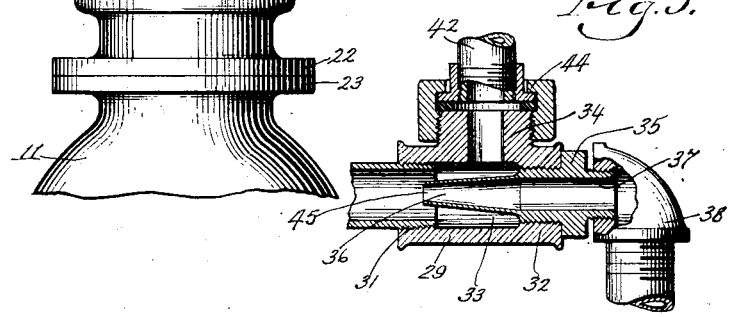
Inventor:
Ezra B. Mead
By Munday, Clarke & Carpenter
Attys.

Patented June 25, 1929.

1,718,475

UNITED STATES PATENT OFFICE.

EZRA B. MEAD, OF OTTUMWA, IOWA, ASSIGNOR TO OTTUMWA IRON WORKS, OF OTTUMWA, IOWA, A CORPORATION OF IOWA.

INTERNAL-COMBUSTION ENGINE.

Application filed July 29, 1925. Serial No. 46,712.

This invention relates in general to jacketed internal combustion engines, and more particularly to internal combustion engines cooled by a circulation of liquid in the jacket, and has for a principal object the provision in such an engine of a novel and efficient cooling system in which the cooling effect of the liquid is distributed throughout the jacket to prevent internal strains such as are set up by unequal cooling and which may cause fractures in the cylinder and head block castings of the engine. In engines of this type provided heretofore, it has been the common practice to inject the cooling liquid into a liquid compartment or jacket surrounding the cylinder and combustion chamber at a low level and to exhaust this liquid at the top of the chamber. The liquid flows through the chamber entering at a relatively low temperature and exhausting at a relatively high temperature, the amount of variation depending upon various factors including the amount of water flowing through the cooling chamber and the power being developed by the engine. The portion of the cylinder adjacent the inlet is cooled to approximately the temperature of the inflowing liquid, and the portion of the cylinder adjacent the outlet, which is usually the combustion chamber, is hardly cooled at all, as the cooling effect of the liquid is dissipated before the liquid arrives at this point and is here drawn off as hot liquid or steam. Unequal expansion is thereby caused in the cylinder parts, which frequently causes a fracture of the cylinder castings.

One of the objects of my invention resides in the provision of a method and means for efficiently cooling an internal combustion engine by creating a circulation of the cooling water through the jacket by continuously injecting cooling water through an inlet located at a low point in the water jacket and by continuously discharging heated cooling water through an aperture located at a high point in the jacket, while simultaneously maintaining an auxiliary circulation by withdrawing or by bleeding off water through another outlet also spaced at a high point in the jacket and re-introducing such water at the water inlet and in such manner as to cause the circulation in said second system to take place by suction caused by the original injection of the cooling water into jacket.

Another important object is to provide a device which may be efficiently cooled with a minimum quantity of cooling liquid and this over a prolonged period of time, thus reducing the consumption of cooling liquid and reducing the alkaline or other deposits that may be accumulated within the cooling chamber.

Numerous other objects and advantages of the invention will be apparent as it is better understood from the following description, which, taken in connection with the accompanying drawings, discloses a preferred embodiment thereof.

Referring to the drawings,

Figure 1 is a view of a cylinder of a gasoline engine embodying my invention and having parts thereof broken away to show certain details of construction.

Fig. 2 is a plan view of the device shown in Fig. 1; and

Fig. 3 is an enlarged detail of construction.

On the drawings, reference character 11 indicates a portion of a crank case, 12 indicates a cylinder block attached to the crank case and 13 indicates a cylinder head block of a gasoline engine of the liquid cooled type, all of which may be of any suitable construction. The cylinder block 12 is of cast metal having an inner or cylinder wall 14 and an outer wall 15 surrounding the inner wall 14 and spaced therefrom to provide a liquid compartment or jacket 16. The head block 13 is also preferably of cast metal having an inner cylinder wall 17 and an outer wall 18 surrounding said inner wall and spaced therefrom to provide a liquid compartment or jacket 19. The liquid compartments 16 and 19 are connected through suitable apertures 21 or otherwise to form a continuous chamber. The cylinder block 12 is preferably flanged at 22 to provide a means of attachment to a corresponding flange 23 formed on the crank case 11, and is also provided with a flange 24 to provide means for attaching the head block 13, which is also flanged at 25. The flanges 22, 23, 24 and 25 may be secured together by any suitable means such as by bolts or the like. A cooling fluid exhaust means 26 comprising a standard pipe of suitable size is provided and is preferably located at the top of the head block 13, being secured in a tapped aperture formed through the wall 18 of the cylinder head. The cooling liquid is supplied through a main feed pipe 27 under pressure from any suitable source of cooling water adapted to supply any number of cylinders. Cooling liquid is supplied to the cylinder from the main feed pipe 27 through an injector device 28, which hereinafter will be more fully described, and through a pipe 39 which enters the outer jacket wall 15 of the cylinder block and discharges cooling liquid into the compartment 16. The cooling liquid thus introduced passes upwardly through the apertures 21 into the jacket compartment 19 and is discharged through the outlet 26. In traveling through the jacket compartment 16, the liquid absorbs heat from the cylinder walls and in the usual cooling system frequently is heated to the boiling point or over, so that the cooling effect of the liquid when it reaches the cylinder head, at which point most of the heat of the engine is developed, is greatly reduced. The operating temperature at the cylinder head is, therefore, greatly in excess of that at the lower cylinder portions and, consequently, dangerous internal stresses are induced in the cylinder parts due to this divergence in temperature. The cooling efficiency of the usual cooling system also is low because of the unequal cooling effect of the liquid in the upper and lower parts of the jacket, the cooling effect being relatively high in the lower portions and relatively low at the cylinder head. To improve this condition, I have provided a novel deviation from the cooling systems heretofore used. Near the top of the cylinder head I arrange an auxiliary outlet or bleeder aperture 43 through which a part of the heated cooling liquid is diverted through suitable piping 42 to the injector 28, the piping having threaded engagement at one end in the outlet aperture 43 and being connected at the other end to the injector device 28 by means of a coupling 44 which has engagement with a threaded portion 34 of the injector 28.

The injector device draws heated cooling fluid from the top of the jacket compartment through the piping 42 by suction and mixes the heated fluid so drawn with the cooling fluid injected from the main feed pipe 27, and injects the mixture into the jacket through the pipe 39. The injector comprises a T-shaped coupling, having internally threaded portions 31 and 32 suitably arranged at opposite ends of the cross portion of the T to provide a chamber 33, the shank of the T being provided externally with screw threads 34. A member 35 adapted for threaded engagement within the internally threaded portion 32 and formed with a hollow nozzle portion 36 arranged substantially as a frustrated cone of sufficient length to extend through the compartment 33, is secured within the cross portion of the T and is connected at its base to the feed pipe 27 by suitable liquid conduits or pipe fittings 38 which have threaded engagement upon a protruding portion 37 of the member 38 and which communicate in suitable manner with the feed pipe 27. The pipe 39 has threaded engagement with the internally threaded portion 31 of the T-shaped member and conducts the fluid therefrom into cylinder jacket 16.

In operation, cooling liquid under pressure is injected from the main feed pipe 27 into the cylinder jacket or liquid compartment 16 through the mixing device 28. In passing through the nozzle 36 under pressure, the injected liquid creates a partial vacuum in the chamber 33 and causes a suction which ejects heated liquid from the cylinder jacket, drawing it through the auxiliary outlet 43 and the conduit 42 into the chamber 33, whence it is re-injected into the cylinder jacket through the pipe 39, together with the cooling water injected through the nozzle 36. The pipe 39 is preferably long enough to permit a thorough mixing of the hot and cold liquids before the mixture enters the jacket 16.

It will be noted that the liquid drawn through the auxiliary outlet and through the conduit 42 is at substantially the same temperature as the liquid discharged through the exhaust outlet 26. Upon mixing this heated liquid with the cold liquid injected from the feed pipe 27, the temperature of the cooling liquid injected at the bottom of the cylinder is raised. By preheating the cooling water in this manner a more uniform distribution of the cooling effect is accomplished. The temperature of the cooling liquid in the lower cylinder jacket portions is raised while the cooling liquid temperature in the upper jacket portions remains the same, so that dangerous stresses in the cylinder, due to large temperature differences, is reduced. Since there are two outlets in the head, the circulation in the head is double that in the base of the cylinder jacket and, consequently, the cooling effect in the cylinder head is doubled so that the temperature of the cooling liquid at the cylinder head is not increased by the preheating of the incoming cooling water and pound for pound of cooling water used, the same total cooling effect is produced as when the water is injected without preheating.

It is thought that the invention and many of its attendant advantages will be understood from the foregoing description, and it will be apparent that various changes may be made in the form, construction and arrangement of the parts without departing from the spirit and scope of the invention or sacrificing all of its material advantages, the form hereinbefore described being merely a preferred embodiment thereof.

I claim:

1. A method of cooling water jacketed internal combustion engines, which comprises, injecting cold water from a suitable source of supply into said jacket and discharging heated water at a remote point in said jacket, while simultaneously ejecting additional heated water from a second remote portion and re-injecting it into said jacket together with the cold water introduced into said jacket from said supply source.

2. A method of cooling water jacketed internal combustion engines, which comprises, creating a water circulation through the jacket by injecting relatively cool water into said jacket and discharging heated water from a remote point in said jacket and simultaneously inducing a secondary circulation of water through said jacket by ejecting relatively hot water from said jacket at a point removed from said discharge point and re-injecting it directly into said jacket through said relatively cool water injecting means.

3. A method of cooling a water jacketed internal combustion engine, which comprises, injecting cooling water into and discharging said water from an outlet in the jacket to cause a circulation through the jacket and simultaneously ejecting heated water from said jacket at a point removed from said outlet by means of and through said cooling water injecting means.

4. In combination with the water jacket of an internal combustion engine, a water inlet pipe disposed at a lower zone in said jacket and two spaced apart water outlet pipes disposed at an upper zone in said jacket, a water inlet nozzle arranged to inject relatively cool water into said water inlet, said nozzle having a chamber surrounding the same and communicating with the discharge of said nozzle and a pipe communicating with said chamber connected to one of said water outlets of the water jacket.

5. An internal combustion engine comprising a cylinder, a jacket about said cylinder separated therefrom, means for introducing cooling liquid into said jacket and removing it at another, an injector device located on the introducing means to eject water from a third point in said jacket and reintroduce the injected water into the jacket.

6. In a cooling system for an internal combustion engine, an injector placed on the inlet side and a connection from a point in the jacket near the head thereof to the injector device, said connection being adapted to set up auxiliary currents within the jacket and preheat the cooling liquid before its initial entrance.

7. An internal combustion engine comprising cylinder and head blocks, said blocks each having cooling chambers therein, the cooling chamber of the head block being larger than the corresponding chamber of the cylinder block, the chambers being freely connected, an inlet aperture at a low point in the cylinder block, an injector device located on the intake line exterior to the cylinder, two outlet apertures near the top of the head block, one of said apertures being connected to the injector device.

EZRA B. MEAD.